United States Patent
Zirwas

(10) Patent No.: US 6,591,106 B1
(45) Date of Patent: Jul. 8, 2003

(54) TRANSMISSION SYSTEM FOR TRANSMITTING DIGITAL SIGNALS IN A RADIO SUBSCRIBER TERMINAL NETWORK

(75) Inventor: Wolfgang Zirwas, Groebenzell (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/200,360

(22) Filed: Nov. 25, 1998

(30) Foreign Application Priority Data

Nov. 25, 1997 (DE) .......................... 197 52 200

(51) Int. Cl.$^7$ ................................. H04Q 7/20
(52) U.S. Cl. ................... 455/450; 455/447; 370/342; 370/330
(58) Field of Search ................ 455/422, 440, 455/447, 450, 550, 309, 513, 522; 370/330, 335, 347

(56) References Cited

U.S. PATENT DOCUMENTS

| | | | | |
|---|---|---|---|---|
| 4,751,728 A | * | 6/1988 | Treat | 379/113 |
| 4,956,875 A | * | 9/1990 | Bernard et al. | 455/13 |
| 5,303,297 A | * | 4/1994 | Hillis | 455/406 |
| 5,448,751 A | * | 9/1995 | Takenaka et al. | 455/450 |
| 5,577,100 A | * | 11/1996 | McGregor et al. | 455/406 |
| 5,586,338 A | * | 12/1996 | Lynch et al. | 455/433 |
| 5,590,156 A | * | 12/1996 | Carney | 375/316 |
| 5,604,528 A | * | 2/1997 | Edwards et al. | 348/5.5 |
| 5,606,602 A | * | 2/1997 | Johnson et al. | 379/115 |
| 5,608,446 A | * | 3/1997 | Carr et al. | 725/114 |
| 5,613,213 A | * | 3/1997 | Naddell et al. | 455/414 |
| 5,646,984 A | * | 7/1997 | Oda | 379/114 |
| 5,758,090 A | * | 5/1998 | Doner | 395/200 |
| 5,781,620 A | * | 7/1998 | Montgomery et al. | 379/115 |
| 5,802,502 A | * | 9/1998 | Gell et al. | 705/37 |
| 5,839,071 A | * | 11/1998 | Johnson | 455/440 |
| 5,862,471 A | * | 1/1999 | Tiedemann, Jr. et al. | 455/406 |
| 5,915,214 A | * | 6/1999 | Reece et al. | 455/406 |
| 5,918,172 A | * | 6/1999 | Saunders et al. | 455/404 |
| 5,974,308 A | * | 10/1999 | Vedel | 455/407 |
| 5,983,092 A | * | 11/1999 | Whinnett et al. | 455/406 |
| 6,009,154 A | * | 12/1999 | Rieken et al. | 379/114 |
| 5,757,766 A | * | 2/2000 | Sugita | 370/206 |
| 6,031,827 A | * | 2/2000 | Rikkinen et al. | 370/330 |
| 6,058,309 A | * | 5/2000 | Huang et al. | 455/433 |
| 6,101,379 A | * | 8/2000 | Rahmann et al. | 455/406 |
| 6,104,792 A | * | 8/2000 | Lautenschlager et al. | 379/114 |
| 6,185,413 B1 | * | 2/2001 | Mueller et al. | 455/404 |
| 6,195,543 B1 | * | 2/2001 | Granberg | 455/407 |
| 6,205,135 B1 | * | 3/2001 | Cinni et al. | 370/356 |
| 6,269,157 B1 | * | 7/2001 | Coyle | 379/114 |
| 6,310,952 B1 | * | 10/2001 | Baldwin et al. | 379/266.1 |

FOREIGN PATENT DOCUMENTS

| | | |
|---|---|---|
| DE | 196 06 439 A1 | 3/1997 |
| EP | 0 845 916 | 6/1998 |
| WO | WO 96/31014 | 3/1996 |
| WO | WO 97/11571 | 3/1997 |

* cited by examiner

*Primary Examiner*—Dwayne Bost
*Assistant Examiner*—Joy K. Contee
(74) *Attorney, Agent, or Firm*—Staas & Halsey LLP

(57) ABSTRACT

In a system for transmitting digital signals in a radio subscriber terminal network, for the digital signal transmission from the base station of a radio cell to the radio subscribers located in the radio cell, the total transmitting power of the base station is divided into a plurality of frequency sub-bands and/or periods with different transmitting powers. From this one or more frequency sub-bands, or respectively, periods with the respectively required transmitting power are allocated to each connection from the base station to a radio subscriber, according to its distance from the base station.

18 Claims, 2 Drawing Sheets

TRANSMISSION SYSTEM FOR TRANSMITTING DIGITAL SIGNALS IN A RADIO SUBSCRIBER TERMINAL NETWORK

BACKGROUND OF THE INVENTION

A radio subscriber terminal network is a system (typically covering an area) of radio cells which respectively contain a stationary base station (usually optimally centrally situated) about which the network terminations (NTs) of the radio subscriber are more or less evenly distributed in a radius of, for example, 1 km. Such a radio cell is sketched in FIG. 1, in which the base station is referenced BS and the radio subscribers (or respectively, their network terminations) are referenced NT. Since the radio field attenuation in a radio system increases quadratically with distance, the radio field strength at the cell margin is significantly less than in the cell interior; in FIG. 1 this attenuation is illustrated with concentric circles about the base station. Additional attenuations conditioned by rain, for example, which likewise depend on distance, can additionally sharply reduce the receiving power available in the network terminations at the cell margin.

In such a radio system, which basically represents a point-to-multipoint system (the transmitter of the base station can reach the receivers of a plurality of subscribers), the signal transmission from the base station downstream to the radio subscribers can proceed in time division multiplex (TDM) in a 155 Mbit/s bit stream, and the signal transmission from the radio subscribers upstream to the base station can proceed in a TDMA (Time Division Multiple Access) method.

In such a system the Shannon channel capacity is not optimally exploited in two respects:

All network terminations (NT in FIG. 1) process the full total bit rate of 155 Mbit/s of the downstream time division multiplex signal, although only a small part of this bit rate is usually assigned to the respective network termination specifically. The high bandwidth of the time division multiplex signal therein leads to a correspondingly poor signal/noise power ratio at the subscriber-specific receiver. In particular, the transmitting power of the base station (BS in FIG. 1) is limited for reasons of telecommunications law and/or for technical reasons, the greatest possible cell radius therefore emerging from defined parameters such as RF transmitting frequency, total bit rate, directivity, and signal/noise ratio; in those network terminations (NT in FIG. 1) which are situated nearer to the base station, the reception power (and thus also the signal/noise power ratio) is greater than what is necessary for a prescribed bit error rate, so that transmitting power is "given away".

The uniform distribution of the total available power over time t and frequency f (common in TDM) is illustrated by the "water-filling diagram" for a channel with a bandwith B, a period T and a transmitting power $P_s$ (FIG. 2). Such an even power distribution as that which is illustrated by the hatched flat surface of the diagram in FIG. 2 is ideal in a radio system in which all network terminations have the same constant distance from the base station. Taking the period T as constant, so that it need not be depicted in the diagram, and introducing the distance r from the base station as the third variable, the shaded curved surface in FIG. 3 is obtained for the transmitting power P needed for a constant bit error rate, this surface emerging in that for each point of the plane the required power P for a prescribed bit error rate (for example, $10^{-9}$) is plotted. Given reliable multipath effects, P is barely dependent on the frequency. In turn, in FIG. 3 the power distribution according to the "water-filling" algorithm (FIG. 2), that is given a power $P_s$ which is not dependent on distance r, is illustrated in hatched fashion. The distance between the curved and the straight surfaces is then a measure of the power termed "given away" given a defined distance r.

To optimize the power distribution in the upstream direction (from the radio subscribers (NT) to the base station BS), the receiving power within a radio cell can be respectively measured at the individual network terminations NT and used as a measure of the respective radio field attenuation, according to which the transmitting power of the relevant network termination is correspondingly readjusted. To optimize the power distribution in the downstream direction (from the base station BS to the radio subscribers (NT)), the individual network terminations NT of a radio cell can be actuated in succession with adaptive antennas, the higher gain of such antennas compared to omnidirectional antennas permitting the bridging of correspondingly greater distances given the same transmitting power. Adaptive antennas are admittedly just at the beginning of development. Different modulation methods can also be utilized for more remote network terminations, on the one hand, and for network terminations in the vicinity of the base station, on the other hand, for example, 16QAM for the inner region and QPSK for the outer region of the radio cell. The required signal/noise ratio (S/N) is smaller in QPSK than in 16QAM by 7 dB. In 16QAM the linearity requirements are admittedly increased, specifically in the amplifiers. Such a method is suitable primarily for OFDM.

SUMMARY OF THE INVENTION

The invention now demonstrates another way to optimize the power distribution within a radio cell.

The invention relates to a system for transmitting digital signals in a radio subscriber terminal network, particularly in a broad-band RLL (Radio in the Local Loop) subscriber terminal network; this transmission system is inventively characterized in that, for the digital signal transmission from the base station of a radio cell to the radio subscribers located in the radio cell, the total transmitting power of the base station is divided into a plurality of frequency sub-bands and/or periods with different transmitting powers, and the digital signals assigned to radio subscribers located a greater or lesser distance from the base station are transmitted in frequency sub-bands and/or periods with correspondingly higher, or respectively, lower transmitting power of the base station.

Thus, in further developments of the invention, a fixed number of frequency sub-bands with respectively strictly prescribed transmitting power of the base station can be provided, from which one or more frequency sub-bands of the respectively required transmitting power are allocated to each connection from the base station to a radio subscriber, according to its distance from the base station. In a further development of the invention the transmitting power of the base station can also be modulated with one or more integral harmonics of a sinusoidal oscillation of a prescribed frequency, and a period of the required transmitting power can be allocated to each connection from the base station to a radio subscriber, according to its distance from the base station.

With such a power scaling in the frequency and/or time range, according to which scaling only a frequency band sub-region, or respectively, period with the respectively required base station transmission power is allocated to the connections, respectively just established, between base station and radio subscribers, the invention advantageously enables an optimal power distribution within the radio cell, it being possible either to reduce the total transmitting power of the base station, accordingly, or even to utilize the gained power to increase the cell radius, given a constant total transmitting power.

The modulation of the transmitting power with one or more sinusoidal oscillations which are integral harmonics of a sinusoidal oscillation of a prescribed frequency enables the specific allocation of phases of high, or respectively, low transmitting power to the individual connections between the base station and the more or less remote radio subscribers, according to the distance. Given sufficiently small modulation frequencies (for example, 10 Khz), a modulation of the transmitting power is associated only with a negligible broadening of the RF spectrum.

Given a division of the total available frequency band into frequency sub-bands of varying base station transmitting power, for example, given 8 frequency sub-bands and a power gradation of, for example, 3 dB per frequency sub-band, respectively, the transmitting power varies by 24 dB. The powers of the frequency sub-bands accumulate geometrically; that is the total power is essentially located in the frequency sub-bands with the highest power. The range increase is correspondingly large.

The signal transmission from the base station downstream to the radio subscribers can in turn proceed in time division multiplex, potentially in each frequency sub-band separately; QPSK can be uniformly provided as modulation method for the data signals to be transmitted. The utilization of mutually orthogonal carriers for the individual frequency sub-bands avoids the filtering losses which are otherwise unavoidable in FDMA (Frequency Division Multiple Access).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

Figure 1:
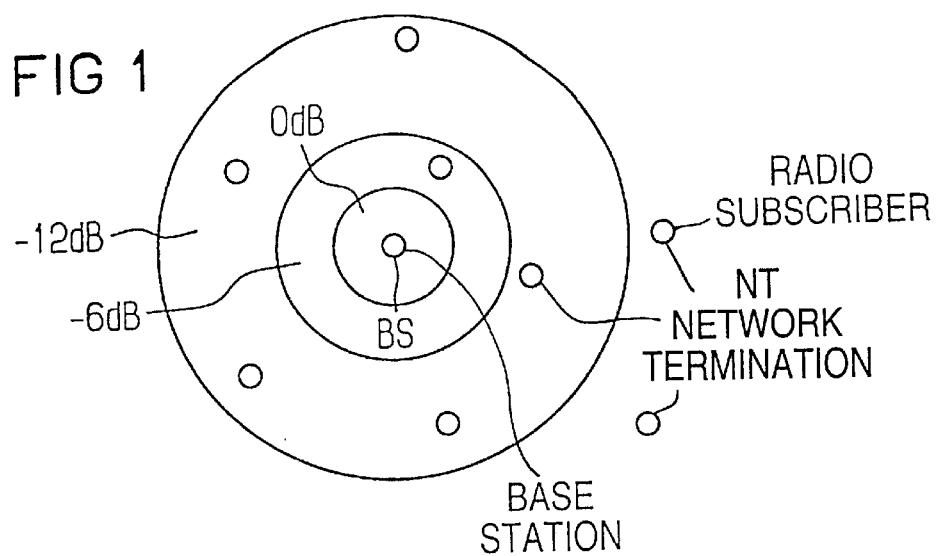
FIG. 1 depicts the typical image of a radio cell with attenuations which arise therein.
Figure 2:
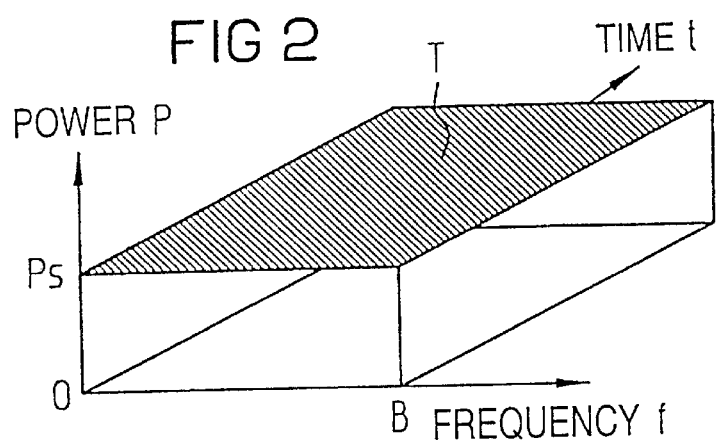
FIG. 2 depicts the even distribution of the available total transmitting power over the time and the frequency.
Figure 3:
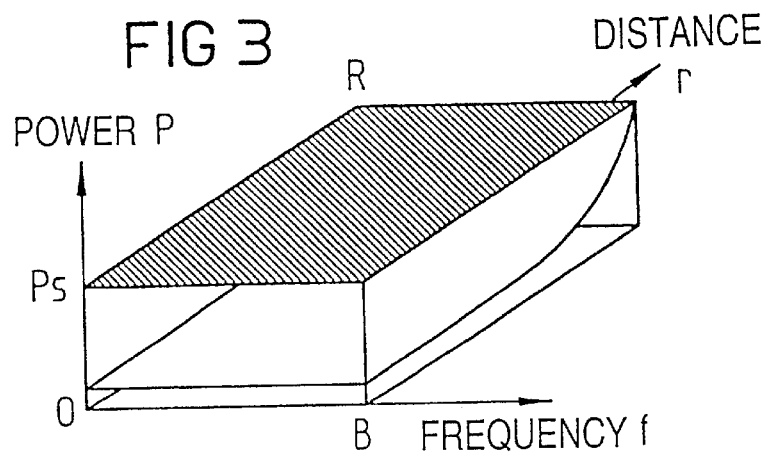
FIG. 3 illustrates the characteristic of the transmitting power which is required for a constant bit error rate dependent on the distance of the radio subscriber from the transmitting base station.

The signals emitted by the base station BS (FIG. 1) with the individual frequency-sub-band-specific transmitting powers form an OFDM (Orthogonal Frequency Division Multiplex) signal with few carriers, the actual multiple access proceeding in time division multiplex (TDM). However, due to the utilization of only a few (for example, 4 to 16) carriers, the outlay for the OFDM remains low. On the other hand, the symbol duration is extended so much that a costly equalizer, which is otherwise necessary in TDM/TDMA due to what are known as multipath distortions, can be forgone.

In OFDM systems the crest factor is very unfavorable in itself, which carries disadvantages primarily in highly non-linear amplifiers. However, in the division of the total available frequency band into frequency sub-bands of varying base station transmitting power, the powers of the frequency sub-bands accumulate geometrically, that is, the total power is essentially determined by the frequency sub-band with the greatest power. The crest factor is thus significantly more favorable than in OFDM with constant carrier amplitudes.

The division of the total available frequency band into frequency sub-bands of varying base station transmitting power also permits an improvement of the frequency re-use. The common channel interference of frequency sub-bands with low transmitting power is intrinsically very low. The common channel interference of the frequency sub-bands with higher power is just as great as in the current systems, but it is now limited to a significantly smaller frequency range. Basically, the transmitting system keeps the interference power as low as possible.

Frequency sub-bands with continuously controllable transmitting power of the base station, and not with respectively strictly prescribed transmitting power, can also be provided. Such a development of the transmitting system permits an adaptive adjustment to the relations respectively prevailing in the radio cell (for example, an increase, conditioned by rain, of the radio field attenuation during the establishment of a connection; the number of active radio subscribers).

The signals assigned to a network termination (NT in FIG. 1) can also be divided into frequency sub-bands of varying power. The received bits are then more or less reliable according to frequency sub-band, the less reliable bits being effectively corrected with the aid of a corresponding coding method.

The frequency band FK0 with the highest power can also be utilized as emergency channel for all connections from the base station (BS in FIG. 1) to the network terminations of the radio subscriber (NT in FIG. 1), via which channel at least telephone traffic is still possible given sharply increased radio field attenuation, conditioned by heavy rain, for example.

Figure 5:
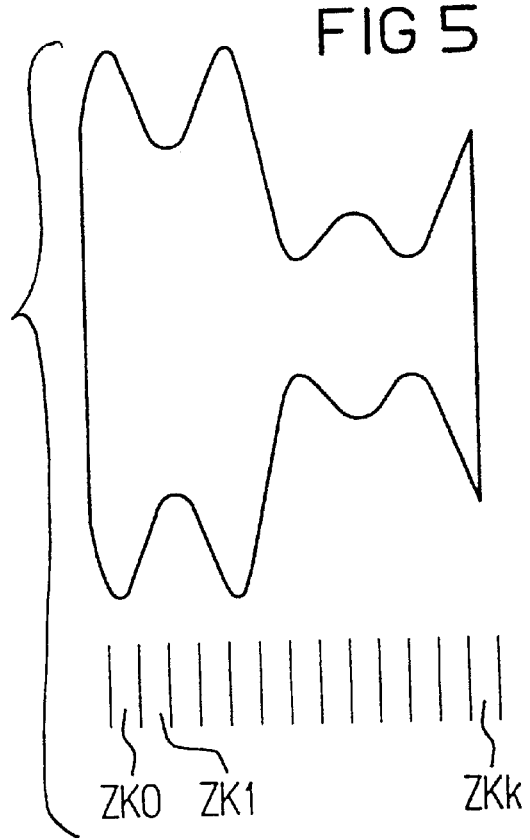

FIG. 5 schematically illustrates a division of the total transmitting power of the base station (BS in FIG. 1) of a radio cell (FIG. 1) into periods ZK0, ZK1, . . . , ZKk of different transmitting powers, from which one or more periods of the respectively required transmitting power(s) is allocated to each connection from the base station to a radio subscriber, according to its distance from the base station, for the digital transmission from the base station to the radio subscribers (NT in FIG. 1) located in the radio cell, so that the digital signals assigned to radio subscribers located a greater distance from the base station are transmitted in periods with correspondingly higher transmitting power of the base station, and the digital signals assigned to radio subscribers located a lesser distance from the base station are transmitted in periods with correspondingly lower transmitting power. The power modulation sketched in FIG. 5 results from the superposition of the first and third harmonics of a sinusoidal oscillation (for example, of 10 kHz). In the receivers of the radio subscribers the power modulation can be cancelled out again with the aid of an opposite modulation.

The signals assigned to a network termination (NT in FIG. 1) can also be divided into periods of varying power. The received bits are then more or less reliable, depending on the period, the less reliable bits being effectively corrected with the aid of a corresponding coding method.

The period Z0 with the highest power can also be utilized as emergency channel for all the connections from the base station (BS in FIG. 1) to the network terminations of the radio subscriber (NT in FIG. 1), via which channel at least telephone traffic is still possible given sharply increased radio field attenuation, for example, conditioned by heavy rain.

Figure 4:
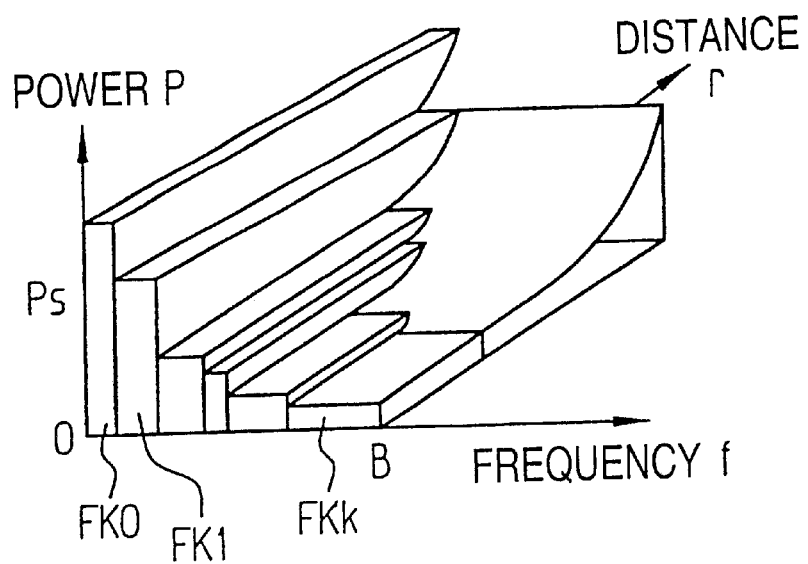
FIG. 4 schematicaly depicts an exemplifying embodiment of a division of the total transmitting power of the base station (BS in FIG. 1) of a radio cell (FIG. 1) into frequency sub-bands FK0, FK1, . . . FKk of different transmitting powers, from which one or more of the frequency sub-bands of the respectively required transmitting power(s) are allocated to each connection from the base station to a radio subscriber, according to its distance from the base station, for the digital transmission from the base station to the radio subscribers (NT in FIG. 1) located in the radio cell, so that the digital signals assigned to radio subscribers located a greater distance from the base station are transmitted in frequency sub-bands with correspondingly higher transmitting power of the base station, and the digital signals assigned to radio subscribers located a lesser distance from the base station are transmitted in frequency sub-bands with correspondingly lower transmitting power.

It is also noted that a power scaling in the frequency range, as explained above with the aid of FIG. 4, can also be combined with a power scaling in the time range, as explained above with the aid of FIG. 5, without further explanation being necessary.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A transmitting system for transmitting digital signals in a radio subscriber terminal network, comprising:
   a base station of a radio cell for transmission of digital signals to the radio subscribers located in the radio cell, the base station having a total transmitting power divided into a plurality of frequency sub-bands with continuously controllable transmitting power; the digital signals assigned to the radio subscribers located a greater or lesser distance from the base station being transmitted in at least one of the frequency sub-bands and periods with correspondingly higher or lower transmitting power, respectively.

2. The transmitting system according to claim 1, wherein the system further uses a fixed number of frequency sub-bands with respectively strictly predetermined transmitting power of the base station, from which at least one frequency sub-band of a required transmitting power is respectively allocated to each connection from the base station to a radio subscriber, according to a distance of the radio subscriber from the base station.

3. The transmitting system according to claim 1, wherein the system further uses a transmitting power of the base station modulated with at least one integral harmonic of a sinusoidal oscillation of prescribed frequency, and
   wherein a period of a required transmitting power is allocated to each connection from the base station to a radio subscriber, according to a distance of the radio subscriber from the base station.

4. The transmitting system according to claim 1, wherein a plurality of periods of different transmitting powers are allocated to a connection from the base station to a radio subscriber.

5. The transmitting system according to claim 1, wherein a plurality of frequency sub-bands of different transmitting powers are allocated to a connection from the base station to a radio subscriber.

6. The transmitting system according to claim 1, wherein the system further includes utilization of mutually orthogonal carriers for the individual frequency sub-bands.

7. The transmitting system according to claim 1, wherein a frequency sub-band, or respectively, period of high transmitting power is simultaneously provided as emergency channel for all connections from the base station to the radio subscribers.

8. The transmitting system according to claim 6, wherein the frequency sub-band, or respectively, period with a highest transmitting power is provided as emergency channel.

9. The transmitting system according to claim 1, wherein the network is a broad-band RLL (AS Radio in a Local Loop) subscriber terminal network.

10. A transmitting system for transmitting digital signals in a radio subscriber terminal network, comprising:
    a base station of a radio cell for transmission of digital signals to the radio subscribers located in the radio cell, the base station having a total transmitting power divided into a plurality of frequency sub-bands with continuously controllable transmitting power; the digital signals assigned to the radio subscribers located a greater or lesser distance from the base station being transmitted in a fixed number of the frequency sub-bands with respectively strictly predetermined transmitting power of the base station, from which at least one frequency sub-band of a required transmitting power is respectively allocated to each connection from the base station to a radio subscriber, according to a distance of the radio subscriber from the base station.

11. The transmitting system according to claim 10,
    wherein the system further uses a transmitting power of the base station modulated with at least one integral harmonic of a sinusoidal oscillation of prescribed frequency, and
    wherein a period of a required transmitting power is allocated to each connection from the base station to a radio subscriber, according to a distance of the radio subscriber from the base station.

12. The transmitting system according to claim 10, wherein a plurality of periods of different transmitting powers are allocated to a connection from the base station to a radio subscriber.

13. The transmitting system according to claim 10, wherein a plurality of frequency sub-bands of different transmitting powers are allocated to a connection from the base station to a radio subscriber.

14. The transmitting system according to claim 10, wherein the system further includes utilization of mutually orthogonal carriers for the individual frequency sub-bands.

15. The transmitting system according to claim 10, wherein a frequency sub-band, or respectively, period of high transmitting power is simultaneously provided as emergency channel for all connections from the base station to the radio subscribers.

16. A transmitting system for transmitting digital signals in a radio subscriber terminal network, comprising:

for digital signal transmission from a base station of a radio cell to the radio subscribers located in the radio cell, a total transmitting power of the base station divided into a plurality of at least one of frequency sub-bands and periods with various transmitting power;

digital signals assigned to radio subscribers located a greater or lesser distance from the base station and transmitted in at least one of frequency sub-bands and periods with correspondingly higher or lower transmitting power, respectively, of the base station;

a transmitting power of the base station modulated with at least one integral harmonic of a sinusoidal oscillation of prescribed frequency; and a period of a required transmitting power allocated for each connection from the base station to a radio subscriber, according to a distance of the radio subscriber from the base station.

17. The transmitting system according to claim 16, wherein the system further comprises a fixed number of frequency sub-bands with respectively strictly predetermined transmitting power of the base station, from which at least one frequency sub-band of a required transmitting power is respectively allocated to each connection from the base station to a radio subscriber, according to a distance of the radio subscriber from the base station.

18. The transmitting system according to claim 16, wherein the system further comprises frequency sub-bands with continuously controllable transmitting power of the base station.

* * * * *